(12) United States Patent
Kuroda et al.

(10) Patent No.: US 7,559,306 B2
(45) Date of Patent: Jul. 14, 2009

(54) DOUBLE-LAYER LUBRICATION COATING COMPOSITION, DOUBLE-LAYER LUBRICATION COATING AND PISTON HAVING SAME COATING

(75) Inventors: Yoshimi Kuroda, Mie (JP); Kentaro Sugimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 15 days.

(21) Appl. No.: 11/896,226

(22) Filed: Aug. 30, 2007

(65) Prior Publication Data
US 2008/0060603 A1    Mar. 13, 2008

(30) Foreign Application Priority Data
Aug. 30, 2006   (JP)   ............... P. 2006-232961

(51) Int. Cl.
*C10M 103/00*   (2006.01)
*F01M 11/00*   (2006.01)

(52) U.S. Cl. .................. 123/193.6; 92/223; 29/888.048

(58) Field of Classification Search .............. 123/193.6; 92/223; 29/888.048; 508/107; 523/457, 523/458; 428/418
See application file for complete search history.

(56) References Cited

U.S. PATENT DOCUMENTS

| | | | | |
|---|---|---|---|---|
| 5,486,299 A | * | 1/1996 | Fuwa et al. | ................. 508/106 |
| 5,821,204 A | * | 10/1998 | Kato et al. | ................... 508/106 |
| 6,090,869 A | | 7/2000 | Orkin et al. | |
| 7,261,925 B2 | * | 8/2007 | Nesbitt | ........................ 427/470 |
| 2007/0004598 A1 | * | 1/2007 | Maeda | ........................ 508/106 |

FOREIGN PATENT DOCUMENTS

| EP | 1 031 726 A2 | 8/2000 |
|---|---|---|
| EP | 1 035 326 A2 | 9/2000 |
| EP | 1 350 817 A1 | 10/2003 |
| EP | 1 469 050 A1 | 10/2004 |
| JP | 64-87851 A | 3/1989 |
| JP | 1-261514 A | 10/1989 |
| JP | 6-279708 A | 10/1994 |
| JP | 7-97517 A | 4/1995 |

* cited by examiner

*Primary Examiner*—M. McMahon
(74) *Attorney, Agent, or Firm*—Arent Fox LLP

(57) ABSTRACT

A double-layer lubrication coating composition is made up of an upper-layer coating composition and a lower-layer coating composition. The upper-layer coating composition is made up of 50 to 70 wt % of an epoxy resin or a polyamide-imide resin, 5 to 20 wt % of boron nitride, and 15 to 30 wt % of silicone nitride or alumina. The lower-layer coating composition is made up of 50 to 70 wt % of an epoxy resin or a polyamide-imide resin, 15 to 30 wt % of polytetrafluoroethylene and 5 to 20 wt % of molybdenum disulfide and may include graphite as required.

3 Claims, 6 Drawing Sheets

DOUBLE-LAYER LUBRICATION COATING COMPOSITION, DOUBLE-LAYER LUBRICATION COATING AND PISTON HAVING SAME COATING

BACKGROUND OF THE INVENTION

1. Field of the Invention

The present invention relates to a lubrication coating composition which can form a dry coating having superior bonding properties to a base material such as a piston skirt and superior sliding properties, and more particularly to a double-layer lubrication coating composition having an upper-layer coating composition and a lower-layer coating composition.

2. Description of Related Art

Conventionally, a method for forming a lubrication coating on a surface of a sliding component of an internal combustion engine has been adopted as one of means for improving the wear resistance and seizing resistance of the relevant component. Then, there has been proposed a composition in which a solid lubricant is compounded into a resin acting as a binder as a means for improving the sliding property of the lubrication coating.

For example, Japanese Patent Unexamined Publication JP-A-01-261514 describes a sliding material which is compounded of 20 to 80% by volume of a polyimide resin or a polyamide-imide resin, 10 to 60% by volume of polytetrafluoroethylene as a solid lubricant, 0.5 to 20% by volume of alumina and the like.

In addition, Japanese Patent Unexamined Publication JP-A-64-087851 describes that a coating is applied to a piston by employing a solid film lubricant made up by compounding 25 to 125 parts by weight of polytetrafluoroethylene per 100 parts by weight of polyimide resin in order to increase the wear resistance of an engine component such as a piston.

Additionally, Japanese Patent Unexamined Publication JP-A-06-279708 describes a low-friction lubrication paint designed to form a coating having a low friction coefficient and superior wear resistance in which 5 to 300 parts by weight of a solid lubricant such as molybdenum disulfide, graphite, boron nitride or the like and 5 to 100 parts by weight of a modifier such as a vinyl resin, polybutadiene or the like are compounded per 100 parts by weight of a high-strength, heat-resistant binder such as an epoxy resin.

Furthermore, Japanese Patent Unexamined Publication JP-A-07-097517 describes a sliding resin composition designed to attain a low friction coefficient and high wear resistance which is made up of 50 to 73 wt % of at least one of a polyamide-imide resin and a polyimide resin, and, as solid lubricants, 3 to 15 wt % of polytetrafluoroethylene, 20 to 30 wt % of molybdenum disulfide and 2 to 8 wt % of graphite, a total sum of the solid lubricants being 27 to 50 wt %.

In order to reduce the friction coefficient of a lubrication coating in which a solid lubricant is compounded into a resin, the amount of polytetrafluoroethylene to be compounded needs to be increased. However, on the other hand, when the amount of polytetrafluoroethylene to be compounded is increased, since polytetrafluoroethylene and the heat-resistant resin have no bonding force, the wear amount of the resin coating layer is increased. Therefore, it has not been possible to achieve low friction coefficient and high wear resistance simultaneously.

In addition, it has been known that among the solid lubricants, when the amounts of molybdenum disulfide and graphite to be compounded are increased, seizing resistance is increased. However, in the event that molybdenum disulfide and graphite are compounded more than necessary, the strength of the resin coating layer itself is decreased extremely remarkably, and this tends to increase the wear of the resin coating layer.

In addition, it has been known that compounding, for example, alumina and/or silicone nitride as a hard filling material is effective to increase the wear resistance of the resin coating layer. However, it has also been known that in the event that the amount of alumina and/or silicone nitride to be compounded is increased, the friction coefficient on the surface of the resin coating is increased, while the seizing resistance thereof is decreased.

SUMMARY OF THE INVENTION

The invention has been made in view of these conventional situations, and an object thereof is to provide a lubrication coating composition which can form a dry coating which has a superior bonding property to a base material such as an aluminum-alloy piston and a superior sliding property and more particularly a lubrication coating composition which has a low friction coefficient and superior wear resistance and which can increase the initial running-in property and seizing resistance.

With a view to attaining the object, the inventor and others had studied deeply about bonding resins by which coating properties such as heat resistance, oil resistance, bonding property to aluminum-alloy base materials, wear resistance and the like can be obtained with good balance, solid lubricants which can reduce the friction on the surface of a coating, while increasing the initial running-in property and seizing resistance thereof, and furthermore, hard particles which are used for the purpose of increasing the wear resistance of a resin coating with respect to formulation and composition thereof and coating properties obtained thereby and reached the present invention as a result of the studies.

According to an aspect of the invention, there is provided a double-layer lubrication coating composition including:

an upper-layer coating composition including:

50 to 70 wt % of a bonding resin including at least one of an epoxy resin and a polyamide-imide resin;

5 to 20 wt % of a solid lubricant including a boron nitride; and 15 to 30 wt % of a hard particle including at least one of silicone nitride and alumina; and a lower-layer coating composition including:

50 to 70 wt % of a bonding resin including at least one of an epoxy resin and a polyamide-imide resin; and a solid lubricant including 15 to 30 wt % of a polytetrafluoroethylene and 5 to 20 wt % of a molybdenum disulfide.

According to another aspect of the invention, there is provided a double-layer lubrication coating composition including:

an upper-layer coating composition including:

50 to 70 wt % of a bonding resin including at least one of an epoxy resin and a polyamide-imide resin;

5 to 20 wt % of a solid lubricant including a boron nitride; and 15 to 30 wt % of hard particles including at least one of silicone nitride and alumina; and a lower-layer coating composition including:

50 to 70 wt % of a bonding resin including at least one of an epoxy resin and a polyamide-imide resin;

a solid lubricant including:

15 to 30 wt % of polytetrafluoroethylene; and a molybdenum disulfide and graphite, total amount of the molybdenum disulfide and the graphite being 5 to 20 wt %, and an amount of graphite being 1 to 10 wt %.

Furthermore, according to another aspect of the invention, there is provided a double-layer lubrication coating formed from above described either of the double-layer lubrication coating composition.

Furthermore, according to another aspect of the invention, there is provided an internal combustion engine piston including a double-layer lubrication coating formed from the above described either of the double-layer lubrication coating composition on an outer circumferential surface of a piston skirt.

According to the invention, by employing the double-layer lubrication coating composition including the upper-layer coating composition and the lower-layer coating composition, the double-layer coating or the lower-layer coating and the upper-layer coating can be formed which have superior bonding properties to the base material, low friction coefficient, and superior wear resistance, initial running-in property and seizing resistance. Consequently, in a sliding member having the double-layer lubrication coating of the invention, the upper-layer coating which has superior initial running-in property and seizing resistance makes up a good smooth sliding surface when coming into sliding contact with a mating member, and the wear resistance also becomes good due to the steady-state wear amount being reduced by the action of the lower-layer coating which is superior in lowering friction.

Because of this, the double-layer lubrication coating according to the invention is effective in a field which requires seizing resistance, wear resistance and low friction coefficient and hence is particularly effective for a piston of an internal combustion engine, for example. Moreover, the double-layer lubrication coating composition of the invention can be calcined at a temperature of 200° C. or lower which can be, applied to an aluminum-alloy piston of an internal combustion engine, and in particular, the double-layer lubrication coating composition has the superior bonding property to aluminum alloys and also has good initial running-in property, seizing resistance and wear resistance. Consequently, the durability of a sliding member is increased remarkably, and the seizing surface pressure is increased. Furthermore, the reduction in friction coefficient can be expected by virtue of the advantage of the lower-layer coating after the initial running-in is over.

DETAILED DESCRIPTION OF EXEMPLARY EMBODIMENTS OF THE INVENTION EMBODIMENTS

Figure 1:
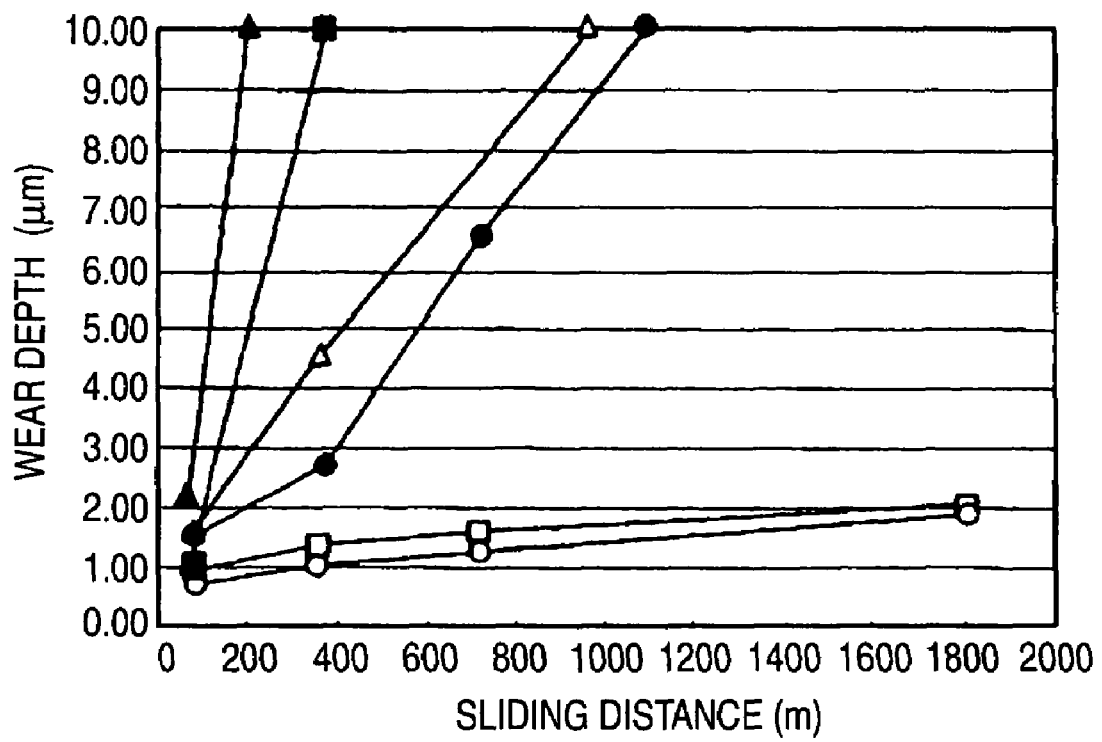
FIG. 1 is a graph showing wear amounts of respective lubrication coatings of Samples 1 and 3 under a dry lubrication environment in Example 1.

A double-layer lubrication coating composition of the invention includes an upper-layer coating composition and a lower-layer coating composition and employs, as a boding resin, an epoxy resin or a polyamide-imide resin, which has superior heat resistance, wear resistance and bonding property, or both of the resins. In addition, as hard particles which are used only in the upper-layer coating composition, one or both of silicone nitride ($Si_3N_4$) and alumina ($Al_2O_3$) can be used. When the average particle diameter of a hard particle becomes less than 0.1 μm, wear resistance is reduced, whereas when the average particle diameter thereof exceeds 5 μm, the wear of a mating material is increased. Because of this, the average particle diameter is preferably in the range of 0.1 to 5 μm and is more preferably in the range of 0.1 to 2 μm.

The upper-layer coating composition includes 50 to 70 wt % of an epoxy resin and/or a polyamide-imide resin as a bonding resin, 5 to 20 wt % of boron nitride (BN) as a solid lubricant and 15 to 30 wt % of silicone nitride and/or alumina as a hard particle. When the bonding resin becomes less than 50 wt %, wear resistance and bonding property are reduced due to a reduction in bonding force, whereas when the bonding resin exceeds 70 wt %, since the solid lubricant and hard particles are reduced relatively, lubricity and wear resistance are reduced. When boron nitride, which is the solid lubricant, becomes less than 5 wt %, lubricity is reduced, whereas it exceeds 20 wt %, wear resistance is reduced. In addition, when the hard particles become less than 20 wt %, wear resistance is reduced, whereas they exceed 30 wt %, lubricity is reduced.

The lower-layer coating composition is made up of 50 to 70 wt % of an epoxy resin and/or polyamide-imide resin as a boding resin, which is similar to the upper-layer coating composition, and as a solid lubricant, basically 15 to 30 wt % of polytetrafluoroethylene and 5 to 20 wt % of molybdenum disulfide ($MoS_2$) are used. When the bonding resin is reduced to be less than 50 wt %, wear resistance and bonding property are reduced, whereas when it exceeds 70 wt %, the solid lubricant is reduced, whereby low friction and seizing resistance are deteriorated. In addition, when polytetrafluoroethylene is reduced to be less than 15 wt %, lubricity is reduced, whereas when it exceeds 30 wt %, the wear amount is increased. Furthermore, when molybdenum disulfide is less than 5 wt %, seizing resistance is reduced, whereas it exceeds 20 wt %, the strength of the coating is reduced, whereby the wear amount is increased.

In addition, with molybdenum disulfide as the solid lubricant, an enhancement in seizing resistance can be realized through a synergetic effect with graphite. Namely, in the lower-layer coating composition, as the solid lubricant, in addition to polytetrafluoroethylene, molybdenum disulfide and graphite can be used in parallel therewith. As this occurs, a total amount of molybdenum disulfide and graphite is in the range of 5 to 20 wt %, and in addition to this, it is desirable to use 1 to 10 wt % of graphite. When graphite becomes less than 1 wt %, the advantage resulting from the increase in seizing resistance due to the parallel usage of graphite cannot be obtained, whereas when it exceeds 10 wt %, wear resistance is reduced.

In order to adjust the upper-layer coating composition and the lower-layer coating composition which make up the double-layer lubrication coating composition, for example, an organic solvent is compounded into the epoxy resin and/or the polyamide-imide resin which is the bonding resin, and a solid lubricant is added to the resulting resin solution with hard particles added further thereto as required, so that what has resulted may be mixed and dispersed by employing a bead mill.

In addition, the compounding amounts of the bonding resin, the solid lubricant such as PTEF, $MoS_2$ and graphite, and the hard particles are adjusted to be 100 wt % in total.

In addition, the double-layer lubrication coating composition of the invention is diluted by an organic solvent as required, so as to be coated on a base material as paint. Namely, a lower-layer coating paint and an upper-layer coating paint are coated sequentially on the base material in this order, and are then calcined so that the paints so coated are set, whereby a double-layer lubrication coating is obtained. There is no specific limitation on the organic solvent that is used for dilution, provided that an organic solvent used is of a solvent system and can dissolve the bonding resin. Calcination conditions such as calcination temperature and calcination time may be set appropriately, and since calcination at a temperature of 200° C. or lower is possible, the invention can be applied to base materials of aluminum-alloy. In addition, although the thickness of the double-layer lubrication coating can be selected appropriately, in consideration of coating workability and costs, the thickness is desirably in the range of 5 to 40 μm.

Specifically, a surface of a base material on which a double-layer lubrication coating is to be formed is pre-treated with solvent degreasing or alkaline degreasing so as remove oils and/or dirt therefrom. Then, a lower-layer coating paint is first coated on the surface of the base material by employing a known method such as air spraying or screen printing, and following this, an upper-layer coating paint is coated. Thereafter, the base material is dried to remove the organic solvent and is then calcined, for example, 30 minutes at 180° C. or 20 minutes at 200° C., whereby a double-layer lubrication coating made up of the lower-layer coating and the upper-layer coating can be formed.

The double-layer lubrication coating of the invention can be widely applied to sliding members having various applications under oil-lubricated environment and dry lubrication environment. The epoxy resin and polyamide-imide resin, which act as the bonding resin of the double-layer lubrication coating, have superior bonding properties, and hence can be used for any types of base materials. Thus, the double-layer lubrication coating of the invention can be applied to base materials of various types of aluminum alloys, cast irons, steels and copper alloys. Among them, the double-layer lubrication coating of the invention is preferably applied to a piston of an internal combustion engine, particularly, to a piston skirt.

EXAMPLES

Example 1

An epoxy resin (EP) and a polyamide-imide resin (PAI) were used as bonding resin, boron nitride (BN), polytetrafluoroethylene (PTFE) and molybdenum disulfide ($MoS_2$), graphite (GF) were used as solid lubricants, and silicone nitride ($Si_3N_4$) was used as hard particles, and they were compounded to realize compositions for an upper-layer coating composition and a lower-layer coating composition shown as Samples 1 to 3 in Table 1 below. Note that Sample 3 is a comparative example and was a single-layer coating composition.

TABLE 1

| | Uper-layer coating composition (wt %) | | | | Lower-layer coating composition (wt %) | | | | |
|---|---|---|---|---|---|---|---|---|---|
| Samples | EP | PAI | BN | $Si_3N_4$ | EP | PAI | PTFE | $MoS_2$ | GF |
| 1 | 62.5 | — | 12.5 | 25.0 | 60.2 | — | 21.7 | 14.5 | 3.6 |
| 2 | — | 62.5 | 12.5 | 25.0 | — | 63.7 | 21.9 | 14.3 | — |
| 3* | — | — | — | — | — | 63.7 | 21.9 | 14.3 | — |

*comparative example

An organic solvent was added to and mixed with each of coating compositions of Samples 1 to 3 in Table 1 above and thereafter was dispersed 30 minutes by a bead mill, whereby respective upper-layer coating paints and lower-layer coating paints were obtained. The respective upper-layer coating paints and lower-layer coating paints were coated on test pieces made of an aluminum alloy AC8A (according to Japanese Industrial Standard JIS) and having an average surface roughness of 0.10 to 0.15 μm in Ra (arithmetic average roughness) so that a lower-layer coating has a coating thickness of 5 to 10 μm and an upper-layer coating had a coating thickness of 5 to 10 μm, and the test pieces so coated with the paints were calcined 30 minutes at 180° C. However, as to Sample 3, which was the comparative example, the paint was coated so that the coating of the single layer had a coating thickness of 10+/−2 μm and was calcined 60 minutes at 180° C.

Figure 2:
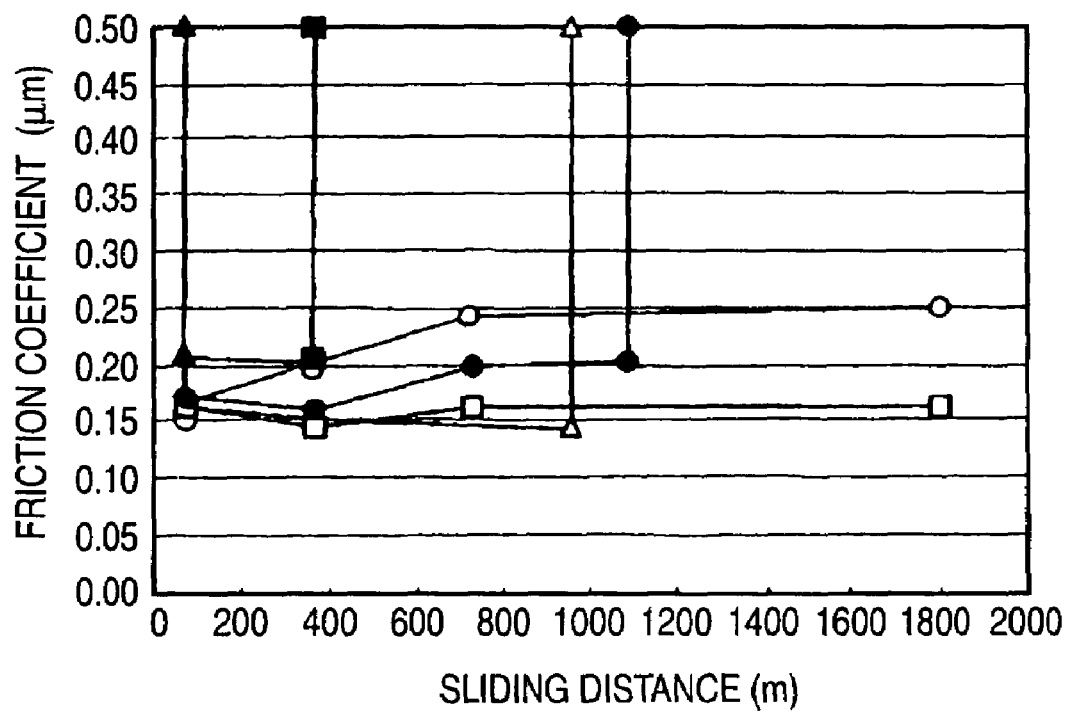
FIG. 2 is a graph showing friction coefficients of the respective lubrication coatings of Samples 1 and 3 under the dry lubrication environment in Example 1.

The respective lubrication coatings of Sample 1, which was the example according to the invention, and Sample 3, which was the comparative example, were tested using a Suzuki's friction and wear testing machine under a dry lubrication environment in which a sliding speed: 0.5 m/sec; a mating member: AC8A; a sliding distance: 1800 m; and a surface pressure: 2.52 to 5.04 MPa so as to measure wear amounts and friction coefficients over the sliding distance. The results of the tests and measurements are shown in FIG. 1 which shows wear amounts (wear depths) and FIG. 2 which shows friction coefficients. In addition, as to seizing resistance, a wear amount of 10 μm or larger was determined as seizing.

As is obvious from FIG. 1, it is indicated that the double-layer lubrication coating of Sample 1, which was the example of the invention, had a small wear amount and high seizing resistance under the dry lubrication environment. In addition, as is obvious from FIG. 2, it is seen that the friction coefficient was also reduced. It is considered that this is because the double-layer lubrication coating had a good initial running-in property, that is, the surface of the double-layer lubrication coating was worn smoothly by virtue of sliding contact with a mating member so as to form a good sliding surface in an initial stage of sliding. Since the steady-state wear amount was reduced as a result of the good sliding surface being obtained, wear resistance was good.

On the other hand, as is obvious from FIG. 1, the single-layer lubrication coating of Sample 3, which was the comparative example, had a larger wear amount than that of Sample 1, which was the example of the invention, under the same surface pressure and low seizing resistance. In addition, as is obvious from FIG. 2, the reduction in friction coefficient was not attained. It is considered that this was because the hardness of the lubrication coating itself of Sample 3 was low, and therefore, a good sliding surface could not be formed by virtue of sliding contact with a mating material in an initial stage of sliding.

From the results that have been described above, Sample 1, which is the example of the invention, has the high seizing resistance and the superior initial running-in property under dry lubrication, and it is obvious that when the phase of sliding is shifted to a sliding with the lower-layer lubrication coating after the initial running-in has been completed, a far lower friction coefficient can be obtained.

Example 2

Figure 3:
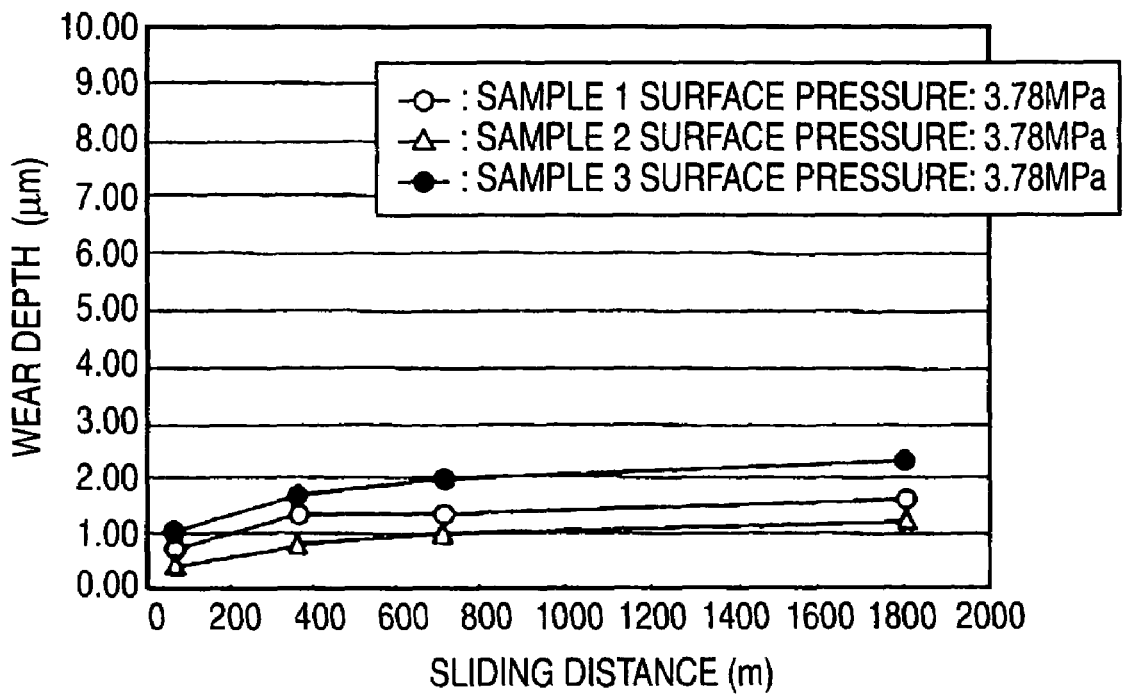
FIG. 3 is a graph showing wear amounts of respective lubrication coatings of Samples 1 to 3 under an oil-lubricated environment in Example 2.
Figure 4:
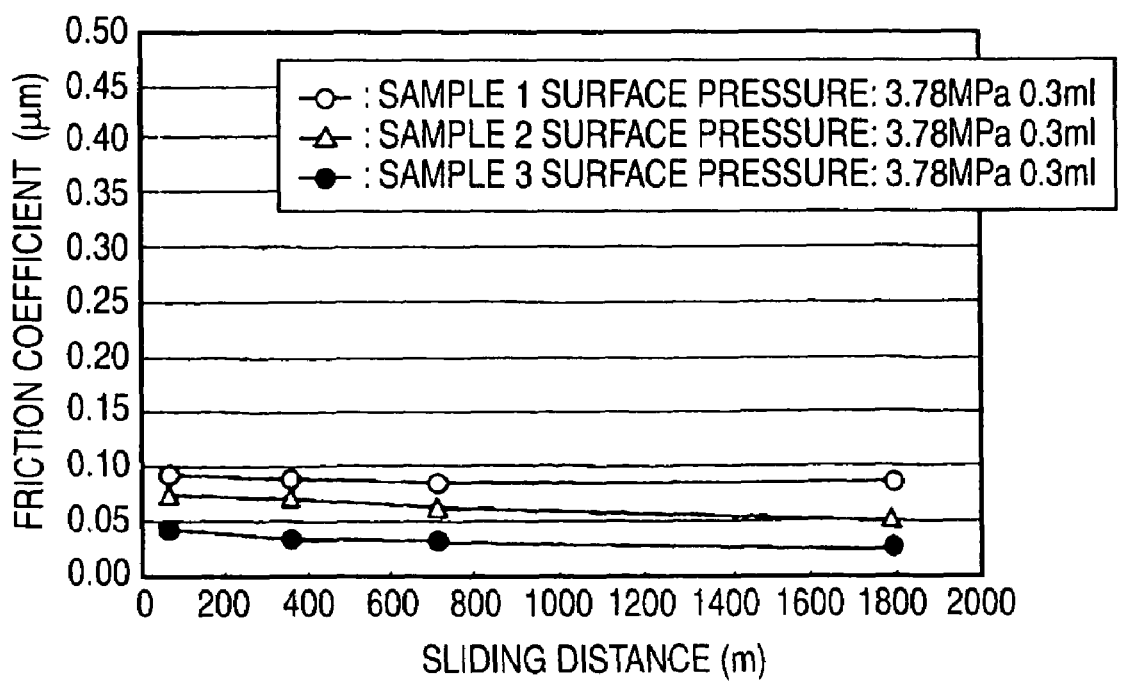
FIG. 4 is a graph showing friction coefficients of the respective lubrication coatings of Samples 1 to 3 under the oil-lubricated environment in Example 2.

The respective lubrication coatings of Samples 1 to 2, which were the examples of the invention, and Sample 3, which was the comparative example, shown in Table 1 of Example 1 were tested using the Suzuki's friction and wear testing machine under an oil-lubricated environment in which a sliding speed: 0.5 m/sec; a mating member: AC8A; a sliding distance: 1800 m; a surface pressure: 3.78 MPa; and oil: 0.3 ml of synthetic oil (PAO-4) so as to measure wear amounts and friction coefficients over the sliding distance. The results of the tests and measurements are shown in FIG. 3 which shows wear amounts (wear depths) and FIG. 4 which shows friction coefficients. In addition, as to seizing resistance, a wear amount of 10 μm or larger was determined as seizing.

As is obvious from FIG. 3, with the double-layer lubrication coatings of Samples 1 to 2, which were the examples of the invention, under the oil-lubricated environment, the wear amount was small and the high seizing resistance was high, compared to Sample 3, which was the comparative example. In addition, as is obvious from FIG. 4, it is seen that the friction coefficient was also reduced. It is considered that this is because the double-layer lubrication coatings had a good initial running-in property even under the oil-lubricated environment, and therefore, the surface of the double-layer lubrication coatings were worn smoothly by virtue of sliding contact with mating members so as to form good sliding surfaces in an initial stage of sliding. Since the steady-state wear amount was reduced as a result of the good sliding surfaces being obtained, wear resistance was also good.

On the other hand, since Sample 3, which was the comparative example, formed the single-layer lubrication coating, and the hardness of the lubrication coating itself was low, the wear amount was increased compared with Samples 1 to 2, which were the examples of the invention. In addition, as is obvious from FIG. 4, although Sample 3 showed a low friction coefficient when an initial running-in had been attained under the oil-lubricated environment, the wear amount was large in the initial state of sliding.

From the results that have been described above, Samples 1 to 2, which are the examples of the invention, have the high seizing resistance and the superior initial running-in property even under oil lubrication, and it is obvious that when the phase of sliding is shifted to a sliding with the lower-layer lubrication coating after the initial running-in has been completed, a far lower friction coefficient can be obtained.

Example 3

Single-layer coating compositions of Samples 5 to 20 were prepared as shown in Table 2 below. When they were prepared, an epoxy resin (EP), a polyamide-imide resin (PAI), a phenol resin (PH) and a polyimide resin (PI) were used as bonding resins, and boron nitride (BN), polytetrafluoroethylene (PTFE), molybdenum disulfide ($MoS_2$) and graphite (GF) were used as solid lubricants, and in addition to silicone nitride ($Si_3N_4$), zirconia ($ZrO_2$), alumina ($Al_2O_3$) and iron oxide ($Fe_2O_3$) were used as hard particles.

TABLE 2

| | Upper-layer coating composition (wt %) | | | Lower-layer coating composition (wt %) | | | | Total |
|---|---|---|---|---|---|---|---|---|
| Samples | Resin | BN | $Si_3N_4$ particles | resin | PTFE | $MoS_2$ | GF | evaluation |
| 1 | EP/62.5 | 12.5 | 25.0 — | EP/60.2 | 21.7 | 14.5 | 3.6 | A |
| 2 | PAI/62.5 | 12.5 | 25.0 — | PAI/63.7 | 21.9 | 14.3 | — | A |
| 3* | — | — | — — | PAI/63.7 | 21.9 | 14.3 | — | D |
| 4* | — | — | — — | — | — | — | — | D |
| 5* | — | — | — — | EP/60.2 | 21.7 | 12.0 | 3.6 | D |
| 6* | PH/62.5 | 12.5 | 25.0 — | — | — | — | — | C |
| 7* | PI/62.5 | 12.5 | 25.0 — | — | — | — | — | C |
| 8* | PAI/62.5 | 12.5 | 25.0 — | — | — | — | — | B |
| 9* | EP/62.5 | 12.5 | 25.0 — | — | — | — | — | B |
| 10* | EP/62.5 | 12.5 | — $ZrO_2$/25.0 | — | — | — | — | D |
| 11* | EP/62.5 | 12.5 | — $Al_2O_3$/25.0 | — | — | — | — | B |
| 12* | EP/62.5 | 18.8 | 18.8 — | — | — | — | — | B |
| 13* | EP/62.5 | 25.0 | 12.5 — | — | — | — | — | D |
| 14* | EP/50.0 | — | 50.0 — | — | — | — | — | C |
| 15* | EP/62.5 | — | 37.5 — | — | — | — | — | C |
| 16* | EP/83.3 | — | 16.7 — | — | — | — | — | D |
| 17* | EP/62.5 | 9.4 | 28.1 — | — | — | — | — | B |
| 18* | EP/62.5 | 8.4 | 16.6 $Fe_2O_3$/12.5 | — | — | — | — | D |
| 19* | PAI/66.7 | — | 33.3 — | — | — | — | — | D |
| 20* | PAI/50.0 | — | 50.0 — | — | — | — | — | D |

An organic solvent was added to and mixed with each of coating compositions of Samples 5 to 20 shown in Table 2, which were comparative examples, and Samples 1 to 2, which were the examples of the invention, and Sample 3, which was the comparative example, shown in Table 1 in Example 1 and was dispersed 30 minutes in a bead mill. Respective coating paints so obtained were coated on piston skirts made of an aluminum alloy AC8A and were then calcined so as to form lubrication coatings. As this occurred, the coating paints were coated such that for Samples 1 to 2, which were the examples of the invention, lower-layer coatings had a coating thickness of 5 to 10 μm and upper-layer coatings had a coating thickness of 5 to 10 μm, and for the respective samples, which were the comparative examples, a single-layer coating had a coating thickness of 10 to 20 μm. In addition, as calcination conditions, Samples 1 to 2 were calcined 30 minutes at 180° C., and the other samples were calcined 60 minutes at 180° C. Note that Sample 4 was a sample which had no lubrication coating.

The respective pistons were each built in a single-cylinder gasoline engine with an aluminum sleeve of 160 cc and were subjected to a test run of 20 hours with full throttle at 3600 rpm. The respective lubrication coatings of the samples were totally evaluated based on wear and scuff marks on the piston surface and oil consumption after the test run of the engines had completed, the results of which are shown also in Table 2 above. Note that the results of total evaluations were shown using A which indicates that the results were good, B which indicates that there were slight wear and scuff marks, C which indicates that there were clear wear and scuff marks, and D which indicates that there were remarkable wear and scuff marks. It is seen from the results shown in Table 2 that Samples 1 to 2 according to the examples of the invention, which were the double-layer lubrication coatings, are extremely superior when compared to not only Sample 4 which had no lubrication coating but also Samples 3, and 5 to 20.

Example 4

Pitons having the double-layer lubrication coating of Sample 2, which was the example of the invention, and the single-layer lubrication coatings of Samples 3 to 4, which were the comparative examples, shown in Table 2 were prepared in a similar manner to that used in Example 3. These pistons were subjected to a durability test of 150 hours with full throttle at 3600 rpm by employing, similarly to Example 3, a single-cylinder gasoline engine with an aluminum sleeve of 160 cc. Frictions before the full throttle was applied and after 20 hours and 150 hours had elapsed were measured while the engine speed was changed to 2000 rpm, 2500 rpm, 3000 rpm and 4000 rpm, and the wear conditions on the surfaces of the pistons were investigated, the results of which are shown in FIGS. 5 to 8.

Figure 5:
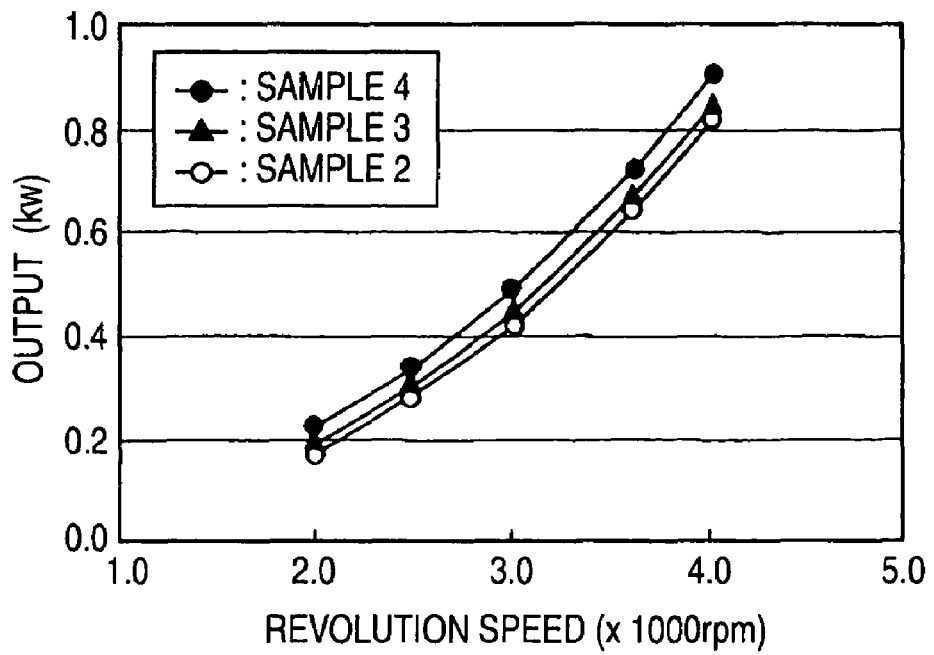
FIG. 5 is a graph showing frictions before full throttle of pistons having respective lubrication coatings of Samples 2 to 4 in Example 4.
Figure 6:
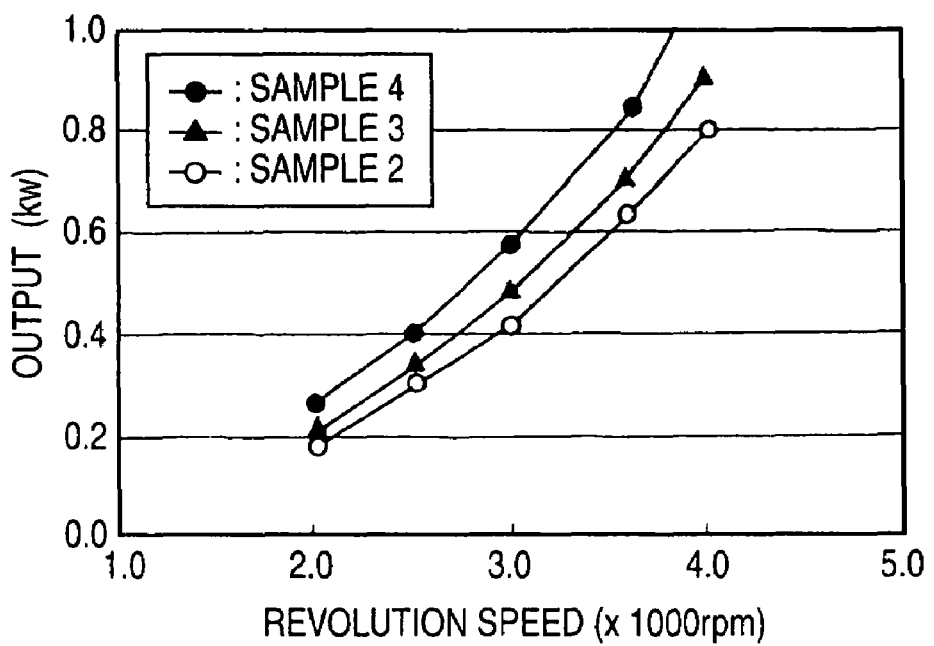
FIG. 6 is a graph showing frictions after 20 hours with full throttle of the pistons having the respective lubrication coatings of Samples 2 to 4 in Example 4.

As is obvious from FIG. 5 which shows frictions of Samples 2 to 4 before the full throttle was applied and FIG. 6 which shows frictions of Samples 2 to 4 after 20 hours had elapsed with full throttle, with the piston having the double-layer lubrication coating of Sample 2, which was the example of the invention, on an outer circumferential surface of its piston skirt, compared to Samples 3 to 4, which were the comparative example, an output which indicates friction was clearly reduced, and it is also clear that Sample 2 had superior seizing resistance and initial running-in property.

Figure 7:
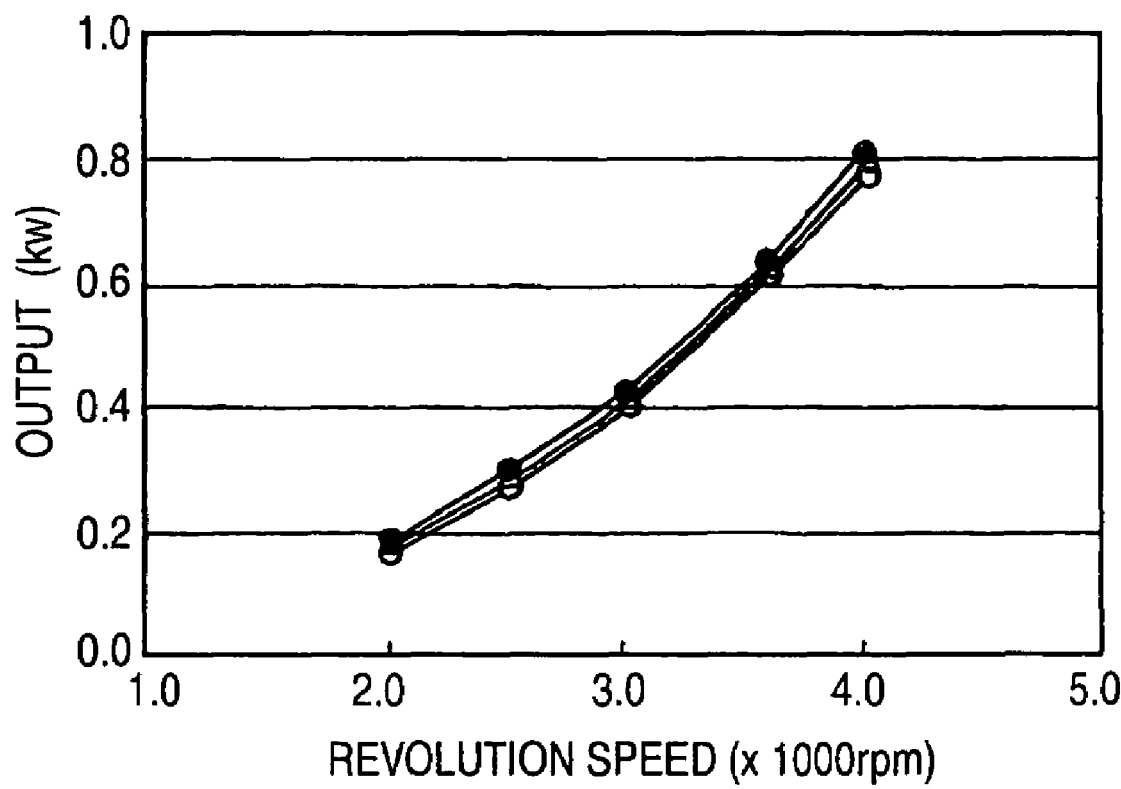
FIG. 7 is a graph showing frictions before full throttle and after elapse of 20 hours and 150 hours of a piston having the lubrication coating of Sample 2 in Example 4.
Figure 8:
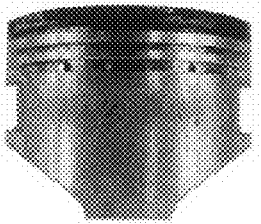
FIG. 8 is photos showing surface conditions of the pistons having the respective lubrication coatings of Samples 2 to 4 in Example 4 after durability tests.

In addition, it is obvious from FIG. 7 which shows the transition of conditions of frictions on Sample 2 of the invention before the full throttle was applied and after 20 hours and 150 hours had elapsed that the piston of Sample 2, which was the example of the invention, is superior in low friction since the output decreased with the passage of evaluation time. Furthermore, it is seen from FIG. 8 which shows photos of surfaces of the pistons of Samples 2 to 4 after the durability tests that the wear and scuffing on Sample 2 of the invention were improved remarkably over Samples 3 to 4 of the comparative examples.

It is seen from the results that have been described heretofore that the piston on which the double-layer lubrication coating was formed using the double-layer lubrication coating composition of the invention showed the good initial running-in property, lower wear amount and high seizing resistance when used in the internal combustion engine. It is considered that this is because the double-layer lubrication coating of the invention was worn smoothly by virtue of sliding contact with the mating material to thereby form a good sliding surface in the initial stage of sliding. In addition, a reduction in friction can be expected by virtue of the advantage of the lower-layer lubrication coating after the initial running-in has been completed.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A double-layer lubrication coating composition comprising:
    an upper-layer coating composition comprising:
        50 to 70 wt % of a bonding resin comprising at least one of an epoxy resin and a polyamide-imide resin;
        5 to 20 wt % of a solid lubricant comprising a boron nitride; and
        15 to 30 wt % of a hard particle comprising at least one of silicone nitride and alumina; and
    a lower-layer coating composition comprising:
        50 to 70 wt % of a bonding resin comprising at least one of an epoxy resin and a polyamide-imide resin; and
        a solid lubricant comprising 15 to 30 wt % of a polytetrafluoroethylene and 5 to 20 wt % of a molybdenum disulfide.

2. A double-layer lubrication coating formed from a double-layer lubrication coating composition as set forth in claim 1.

3. An internal combustion engine piston comprising a double-layer lubrication coating formed from a double-layer lubrication coating composition as set forth in claim 1 on an outer circumferential surface of a piston skirt.

* * * * *